United States Patent
Vernet et al.

(10) Patent No.: US 6,873,569 B2
(45) Date of Patent: Mar. 29, 2005

(54) METHOD, SYSTEM AND PROBE FOR OBTAINING IMAGES

(75) Inventors: Jean-Louis Vernet, Paris (FR); Jean-Francois Gelly, Antibes (FR)

(73) Assignee: Thales, Paris (FR)

( * ) Notice: Subject to any disclaimer, the term of this patent is extended or adjusted under 35 U.S.C. 154(b) by 0 days.

(21) Appl. No.: 10/399,952

(22) PCT Filed: Oct. 19, 2001

(86) PCT No.: PCT/FR01/03252

§ 371 (c)(1),
(2), (4) Date: Apr. 23, 2003

(87) PCT Pub. No.: WO02/35254

PCT Pub. Date: May 2, 2002

(65) Prior Publication Data

US 2004/0004906 A1 Jan. 8, 2004

(30) Foreign Application Priority Data

Oct. 24, 2000 (FR) .............................. 0013634

(51) Int. Cl.$^7$ .............................. C01S 15/00
(52) U.S. Cl. ..................................... 367/11
(58) Field of Search ............... 367/7, 11, 87, 367/103, 138; 600/447; 73/625; 342/179

(56) References Cited

U.S. PATENT DOCUMENTS

| 3,605,043 A | 9/1971 | Bienvenu et al. ............ 333/145 |
| 3,631,719 A | 1/1972 | Charvier et al. .......... 73/861.28 |
| 3,803,391 A | 4/1974 | Vernet ........................ 708/405 |
| 4,301,522 A | 11/1981 | Guyot et al. ................. 367/123 |
| 4,586,172 A | 4/1986 | Vernet et al. .................. 367/97 |
| 4,644,795 A | 2/1987 | Augustine et al. ............. 73/625 |
| 4,870,972 A | 10/1989 | Maerfeld et al. ........... 600/459 |
| 4,893,283 A | 1/1990 | Pesque et al. .................. 367/7 |
| 5,020,034 A | 5/1991 | Solal et al. .................. 367/138 |
| 5,044,370 A | 9/1991 | Dubut et al. ................. 600/459 |
| 5,109,860 A | 5/1992 | Gelly et al. .................. 600/459 |
| 5,329,930 A | 7/1994 | Thomas, III et al. ....... 600/447 |
| 5,774,960 A | 7/1998 | De Fraguier et al. ...... 29/25.35 |
| 6,183,419 B1 * | 2/2001 | Wildes ....................... 600/447 |
| 6,213,947 B1 * | 4/2001 | Phillips ...................... 600/447 |
| 6,341,408 B2 | 1/2002 | Bureau et al. ............. 29/25.35 |

FOREIGN PATENT DOCUMENTS

| EP | 1 026 663 A | 8/2000 |
| WO | 00 57769 A | 10/2000 |

* cited by examiner

Primary Examiner—Daniel Pihulic
(74) Attorney, Agent, or Firm—Lowe Hauptman & Berner LLP.

(57) ABSTRACT

The process, the imaging system and the probe are intended to obtain images by way of waves emitted by an antenna after reflection of these waves at the level of a target-like assembly illuminated by the waves emitted and on the basis of which the images are extracted, said antenna consisting of at least one array of wave emitter/receiver tranducers. The process carries out a series of emissions of the same type by providing the transducers with identical excitation signals which are staggered in time so as to generate an essentially plane wave at each emission. The delays between transducers is determined so that the equiphase surfaces obtained are in line or in a plane according to whether the antenna includes an array of transducers.

13 Claims, 6 Drawing Sheets

FIG. 1
known art

FIG. 2
known art

FIG. 3
known art

FIG. 4
known art

FIG. 5
known art

FIG. 6
known art

METHOD, SYSTEM AND PROBE FOR OBTAINING IMAGES

The invention relates to a process intended to make it possible to obtain images by way of waves emitted by an antenna, after reflection of these waves at the level of a target-like assembly illuminated by the waves emitted and on the basis of which the images are extracted. It also relates to the imaging systems which implement such a process and the wave emission/reception antennas of these systems.

The process according to the invention is more especially intended to be applied to allow the formation of images in two or three dimensions by way of an imaging system whose main element is for example an echograph, a radar or a sonar. It will be more particularly described hereinbelow in the case of an echographic application, although it is equally applicable in the field of radar or sonar, when they work in near-field mode.

It is known in particular that in echography, the general trend is to produce systems equipped with an acoustic emission/reception probe having an antenna furnished with a large number of ultrasound transducers aligned in one or more ranks. Among the various known types of acoustic probe are found in particular 1D acoustic probes, having an antenna consisting of a single alignment of transducers, this antenna has fixed focusing and makes it possible to address just one dimension in the space that it sweeps with sound. Also known are 1.5D probes, having an antenna consisting of several symmetrically controlled transducer alignments, they make it possible to obtain modifiable focusing of the emitted beam. 2D probes are also known, they have an antenna consisting of coplanar transducers which are arranged according to a rectangular or square matrix. They make it possible to vary the direction of the emission and reception beams, spatially, in two beam directions.

A current trend exists with a view to generating ever narrower beams, this entailing the need for ever more severe time constraints. Thus, for example, in echography, where the maximum distance of exploration is conventionally of the order of 20 cm, the duration of the outward-return journey of an acoustic beam is around 250 μs. A scanning of the space to be explored by 200 channels therefore requires 50 ms, this being at the limit of what is acceptable, when the target assembly is an organ of a living being, it is not possible to perform a Doppler processing of the signals. Moreover, this number of channels is insufficient to allow variable-distance focusing on emission and it is unsuitable in the case where the probe antenna comprises a large number of transducers and, for example, in the case of an antenna with 2500 transducers.

A known solution for solving this problem consists in emitting a wide beam in such a way as to reduce the scanning time in a ratio equal to that of the number of reception channels contained in an emission channel. However, the consequence of this is to decrease the value of the overall ratio of main lobe to side lobes including emission and reception. That which is known, is illustrated in FIGS. 1 to 6. The first three of them respectively show the PSE ratio of a main lobe to the side lobes on emission, in FIG. 1, the ratio PSR on reception corresponding thereto, when the emission and reception lobes have the same width, in FIG. 2, as well as the overall ratio PSG corresponding to the pattern resulting from emission followed by reception, in FIG. 3.

Figure 1:
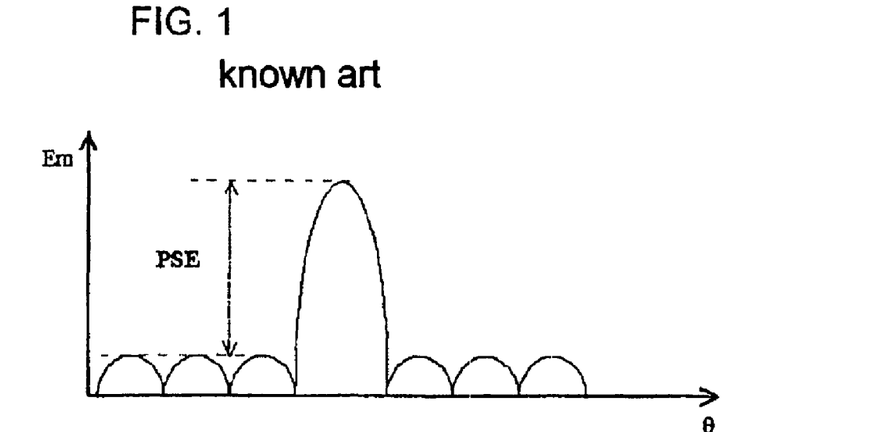
FIGS. 1, 2 and 3 respectively depict patterns illustrating an exemplary main lobe to side lobes ratio for an emission beam, for a reception beam of like width and for the corresponding overall emission plus reception, according to the known art.
Figure 2:
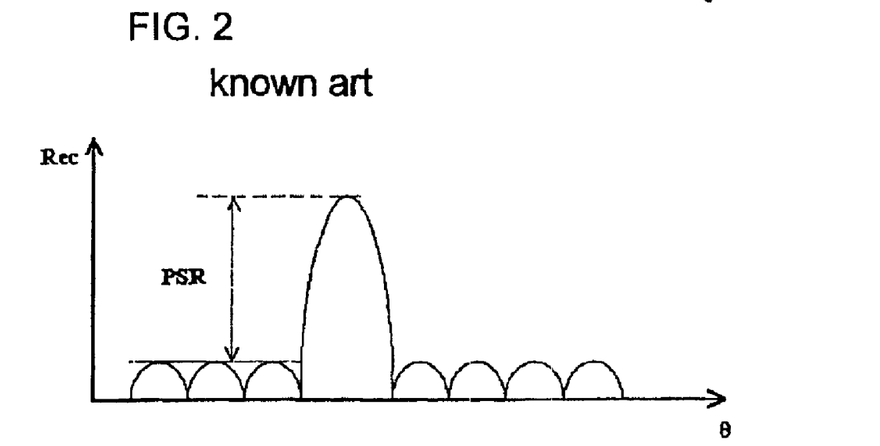
Figure 3:
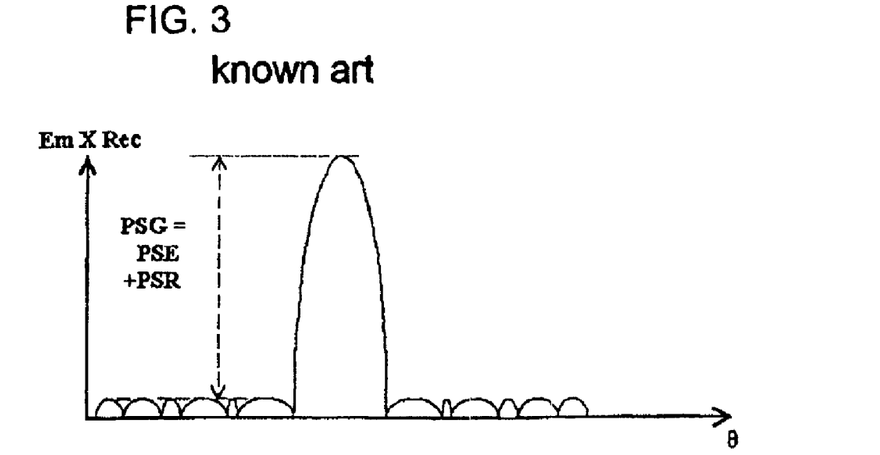
Figure 4:
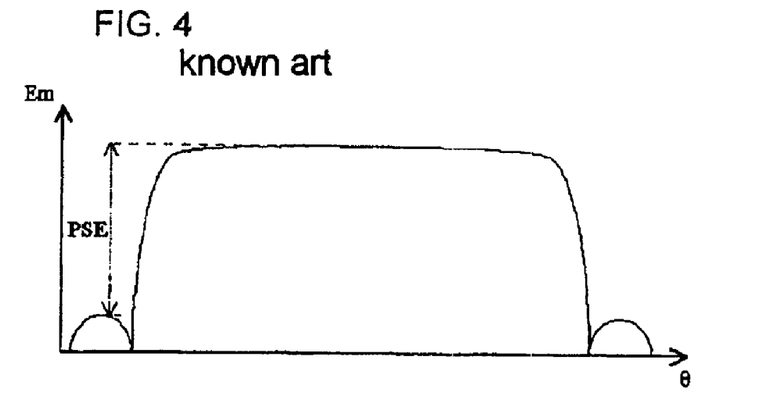
FIGS. 4, 5 and 6 respectively depict patterns illustrating an exemplary main lobe to side lobes ratio for a wide emission beam, for a reception beam of lesser width and for the corresponding overall emission plus reception, according to the known art.
Figure 5:
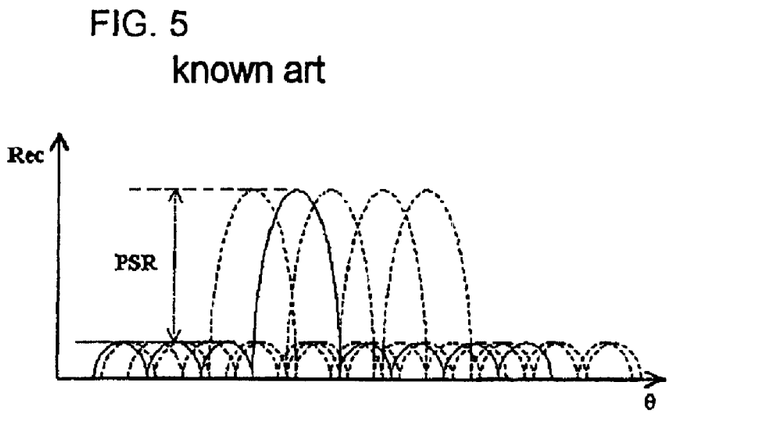
Figure 6:
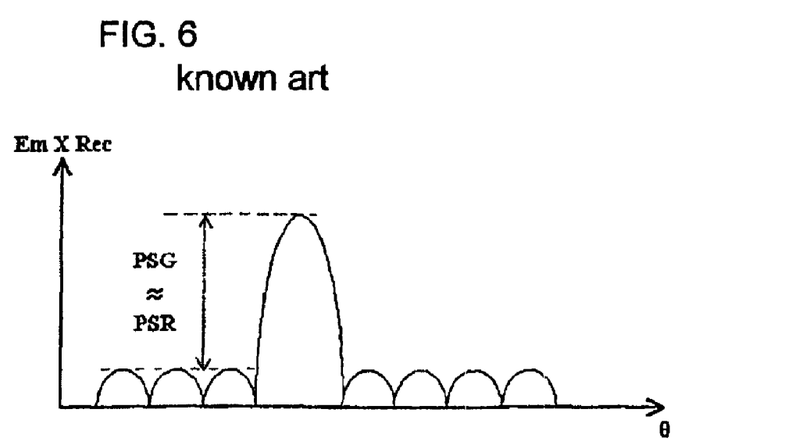

FIGS. 4 to 6 depict these same ratios PSE, PSR and PSG, when the emission beam is wide, as shown in FIG. 4, in particular in relation to the reception beam, illustrated in FIG. 5, the result of this being that the overall ratio PSG practically corresponds to the ratio PSR as indicated in FIG. 6, where only a few reception channels have been represented. Since the overall ratio PSG directly affects the image quality, a widening of the emission pattern then decreases the image quality. The invention therefore provides for the use of a particular sequence of emissions which makes it possible to improve the overall ratio PSG through processing performed on reception and which consequently results in good image quality. It is aimed in particular at making it possible to obtain a much wider emission pattern than the corresponding reception pattern, in such a way as to permit a considerable decrease in the overall illumination time of the targeted assembly.

As already indicated, the invention therefore proposes a process intended to make it possible to obtain images by way of waves emitted by an antenna, after reflection of these waves at the level of a target-like assembly illuminated by the waves emitted and on the basis of which the images are extracted. The antenna therein consists of at least one alignment of wave emitter/receiver transducers.

According to one characteristic of the invention, this process makes provision to carry out a series of emissions of the same type by providing the transducers with identical excitation signals, or signals which differ only by a weighting, which are staggered in time so as to generate an essentially plane wave at each emission, the delays between transducers being determined so that the equiphase surfaces obtained are in line or in a plane according to whether the antenna consists of one alignment of transducers or of several.

The invention also relates to the systems and the wave emission/reception antennas of these systems which make it possible to obtain images by way of waves emitted by an antenna, after reflection of these waves at the level of a target-like assembly illuminated by the waves emitted and on the basis of which the images are extracted, said antenna consisting of at least one alignment of wave emitter/receiver transducers.

According to a characteristic of the invention such a system and such an antenna respectively comprise software and hardware means for the implementation of the process mentioned hereinabove.

The invention, its characteristics and its advantages are specified in the description which follows in conjunction with the figures mentioned hereinbelow.

Figure 7:
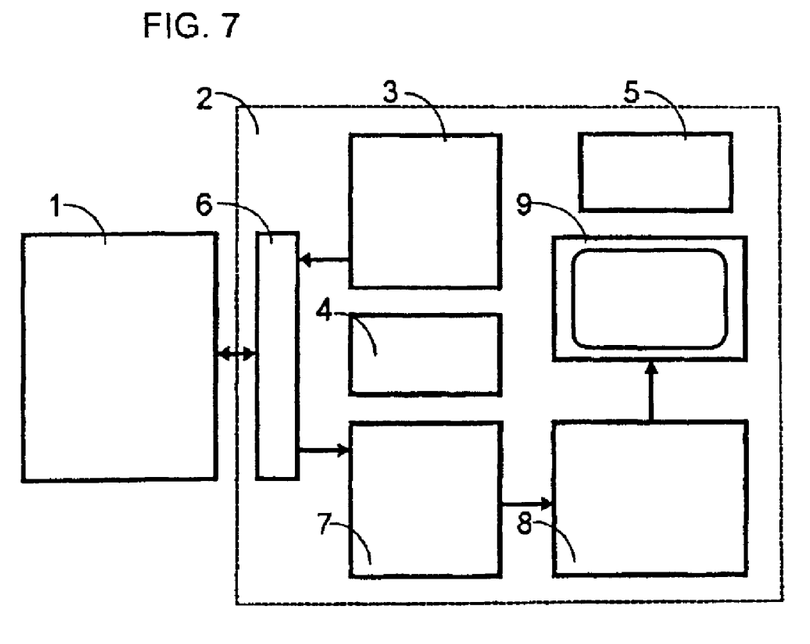
FIG. 7 depicts a schematic of a known imaging system and more especially of an echography system, which is depicted by way of explanatory example.

The imaging system depicted in FIG. 7 comprises an antenna 1 having a plurality of wave emitter/receiver transducers which define an antenna and which are intended to allow a delimited working volume to be swept with sound. In the case where the system 7 is an echographic system, this working volume is that in which the tissues to be echographed for examination should be situated, or placed, and the antenna 1 is an echographic probe antenna. The antenna 1 is then organized, in a manner which will be developed later, so as to make it possible to explore target assemblies and more particularly elements of these assemblies which are situated inside tissues and which are illuminated in a manner determined by the transducers. The latter are used both to emit signals towards the targets and to recover these signals after reflection. As known in echography, the signals are acoustic signals of the ultrasound region.

The antenna 1 is here assumed to be linked to an echograph 2 which comprises an emitter stage 3, wherein are produced the excitation signals which are sent to the transducers of the antenna 1. This sending is performed according to a determined sequencing and with a determined periodicity, under the pulsing of a clock circuit 4, linked to this emitter stage in a conventional manner, not represented here. Control means, for example of keyboard or desk type, of a man/machine interface 5 allow a user to act, on the basis of his requirements, on various constituent elements of the echograph and possibly on the antenna 1.

In the emission phase, excitation signals are transmitted, in the form of periodic pulse trains, to the transducers of the antenna 1, from the emitter stage 3 and by way of a separator stage 6 to which a receiver stage 7 is also linked. The excitation signals are transformed into ultrasound pulse signals at the level of the transducers of the antenna 1. The separator stage 6 makes it possible to prevent the excitation signals from blinding the receiver stage 7. The reflected ultrasound signals which are picked up by the transducers in the reception phase, are taken into account by the receiver stage where they are organized in such a way as to be grouped together in reception channels and in a manner determined as a function of choices made available to the user, in particular for focusing purposes. A signal processing stage 8 makes it possible to translate the signals provided by the receiver stage into signals that can be employed by the user, for example, into echographic images that may be presented on a display screen 9. As is known, the operation of the echograph is governed operationally by way of a programmed management unit in conjunction with the clock circuit 4, this unit may possibly be merged to a greater or lesser extent with the processing stage 8.

Figure 8:
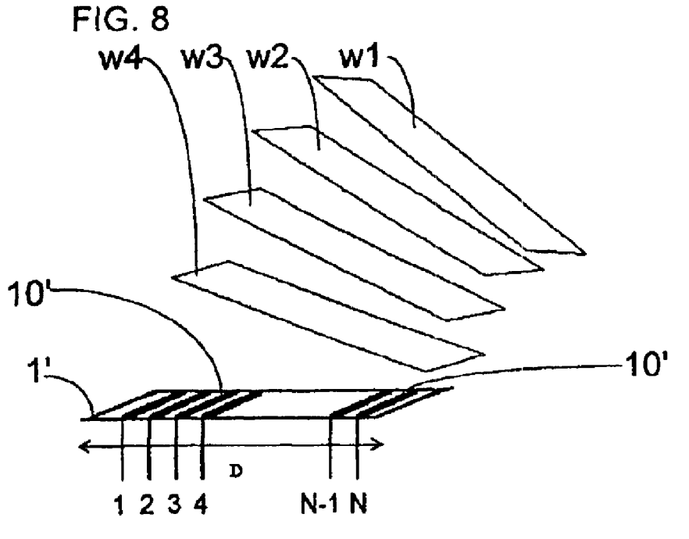
FIGS. 8 and 10 respectively depict sequence patterns for a linear antenna and for a plane antenna.
Figure 9:
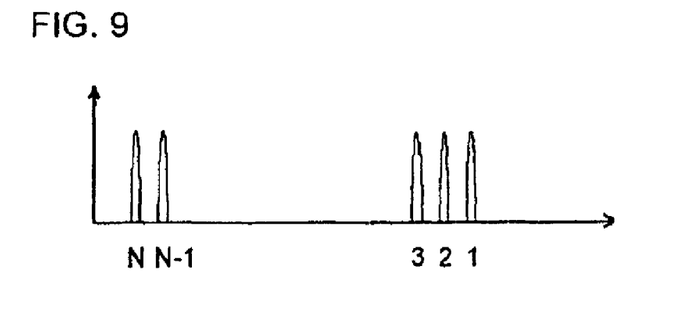
FIG. 9 depicts a pattern representative of a string of pulses for activating the transducers of an antenna.

According to the invention, provision is made to carry out a series of emissions of like type by means of an antenna whose transducers, here assumed identical, are driven with identical excitation signals, possibly to within a weighting, which are staggered in time so that a plane, to within diffraction, wave is generated. The delays between transducers are therefore envisaged such that the equiphase surfaces are in line or in a plane according to the type of the antenna, it being understood that the latter may be of 1D, 1.5D or 2D type, as known. The emissions may in fact be applied in one dimension, as shown schematically in FIG. 8 in the case where the antenna 1' of 1D type, consists of an alignment of N transducers 10', or in two dimensions, as shown schematically in FIG. 10 for an antenna 1", of 2D type, consisting of a matrix of transducers 10". By way of example, a sequence of four plane waves w1, w2, w3 and w4 is depicted in FIG. 8 for an antenna 1', of 1D type, a sequence of three waves W1, W2, W3 being depicted in FIG. 10 for an antenna 1" of 2D type. In all cases, the wave is generated in such a way as to be plane, the excitation signals of the various transducers being staggered in time for this purpose, as shown in FIG. 9, wherein are represented individual pulses corresponding to the activation signals for the transducers 1, 2, 3, ..., N−1, N of the antenna 1', these signals being assumed here to vary linearly with distance.

Figure 10:
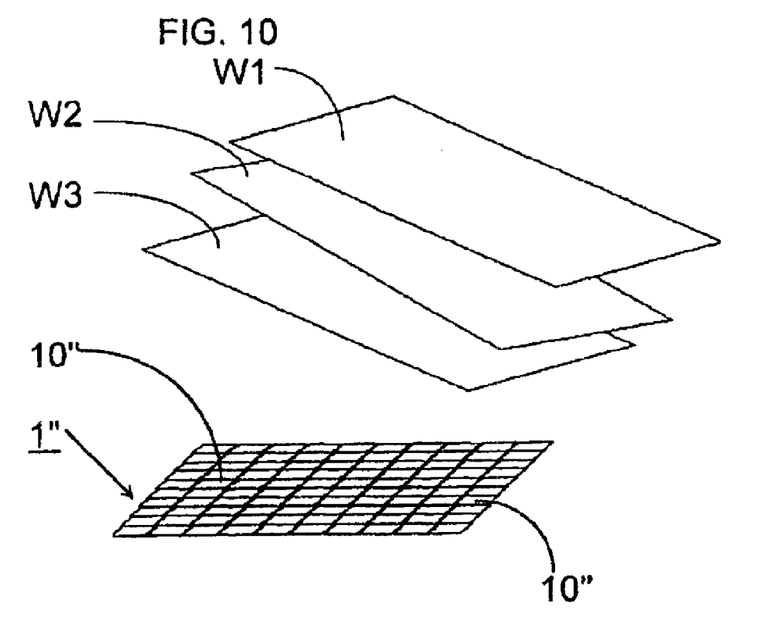

In the case of a near-field imaging system, the dimension or dimensions of the antenna composed of a large number of transducers 10', or 10" as the case may be, are large compared with the wavelength and the range of the imaging system is small compared with the Fresnel distance given by the expression $D^2/\lambda$ where D is the length of an alignment of transducers of the antenna. The wave produced in the sound-swept volume is then plane to a very good approximation. In the case where the central frequency of the signal is equal to 3 MHz and where a linear antenna is used consisting of 256 transducers 10' spaced $\lambda/2$ apart, i.e. therefore 0.25 mm apart, the length of the antenna is 256×0.25=64 mm and the corresponding Fresnel distance is $64^2/0.5$=8192 mm. This distance is therefore very large in relation to the 200 mm which corresponds to the maximum range usually envisaged for echographic exploration.

For an antenna comprising just 64 transducers aligned under the conditions defined hereinabove, the Fresnel distance obtained is 512 mm and it remain very markedly greater than the customary range of 200 mm just recalled. The field, generated under these conditions by a linear antenna of this sort, in such a way that a plane wave is emitted, when this antenna is driven by identical and delayed excitation signals, is then such that it comprises ripples, particularly at the edge of the field, on account of the diffraction at the edges. The introduction of an amplitude weighting makes it possible to considerably reduce these ripples, without significantly modifying the plane nature of the wave generated.

The emission of a plane wave by an array of transducers makes it possible to greatly decrease the image generation time, since a single emission makes it possible to illuminate a surface area equal to the product of the range R of the system times the length of this antenna, where a conventional emission illuminates just one channel.

However, although the illumination by a plane wave decreases the duration of illumination, in a very considerable ratio, on the other hand it causes a decrease in the main lobe to side lobes ratio PSG.

According to the invention, provision is therefore made to increase this main lobe to side lobes ratio PSG by implementing a particular emission pattern based on the principle of synthetic emission. For this purpose, provision is made to emit a series of plane waves whose directions are different. The various reception signals which are obtained in relation to a target point with given geometrical coordinates are summed with amplitude and phase weightings which depend on this point and are such that it is possible to consider there to be re-phasing of the waves at the level of the point, as if these waves had been emitted simultaneously. As is conventionally done, the weightings may be slightly different from those which result in the re-phasing, so as to optimize the quality of the final pattern. The equivalent of an emission pattern is thus obtained for each target point, the multiplication of the reception pattern, by the emission pattern obtained results in an increase in the ratio PSG.

The placing of the reception signals in memory may be carried out either before or after forming the reception channels. There is a certain freedom of choice as regards the transducers of an antenna which are used for reception and they may or may not form part of those which served for emission. The use of a reduced number of transducers in reception makes it possible to avoid an exaggerated increase in the angular aperture, when the exploration distances are short. The constructing of several reception beams with or without overlap is also a solution which may be advantageous, in certain cases.

Figure 11:
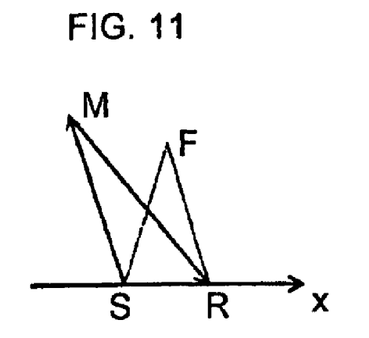
FIGS. 11 and 12 respectively depict diagrams illustrating the formation of channels.

The forming of channels with focusing on emission and on reception is succinctly summarized hereinbelow in conjunction with FIG. 11, where we assume an antenna situated on the x axis emitting a wave focused at a point F. The signal emitted at the point S situated on this axis is defined by the equation:

$$S(t, x) = e(t + SF(x)/c) pe(x)$$

where $e(t)$ is the emission signal, SF is the distance between S and F, c the wave propagation speed and $pe(x)$ is the x-wise weighting of $s(t)$.

The signal received at the level of a point M is expressed by the equation:

$$M(t, F) = \int S\left(t - \frac{SM(x, M)}{c}\right) dx$$

If the point M coincides with F, we have $M(t) = \int e(t) pe(x) dx$

The signal received at the point R situated on the x axis is expressed by the equation $$R(t, u) = M\left(t - \frac{MR(u, M)}{c}\right)$$

The signal received overall at the output of the reception antenna is:

$$R_{ff}(t, M, F) = \int R\left(t + \frac{RF(u)}{c}\right) pr(u)$$

This equation may be expanded, as indicated hereinbelow:

$$R_{ff}(t, M, F) =$$
$$\int \int e\left(t + \frac{SF(x)}{c} - \frac{SM(x, M)}{c} - \frac{MR(u, M)}{c} + \frac{RF(u)}{C}\right) pe(x) pr(u) dx du$$

The element $R_{ff}(t, M, F)$ is the contribution of the reflector situated at M to the signal received, when the emission channel and the reception channel are likewise focused at F. this contribution corresponds to the spatial part of the ambiguity diagram.

Figure 12:
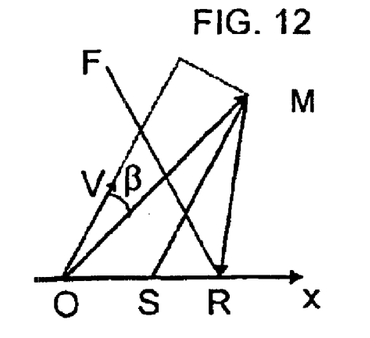

If the point M coincides with F, the following holds:

$$R_{ff}(t, M, F) = \int \int e(t) pe(x) pr(u) dx du$$

this corresponding to the product of the emission and reception weightings. The illumination by a single plane wave on emission and the forming of channels with focusing on reception are succinctly summarized hereinbelow in conjunction with FIG. 12. The antenna is generally situated on a curve or any surface; for the simplicity of the figure it is represented situated on the x axis; each transducer emits a signal, possibly broadband, creating a plane wave, i.e. focused at infinity, whose wave vector is directed along $\vec{V}$ of unit length.

As the wave is plane, the delay of the signal received at a point M with respect to a point O taken as reference is equal to $\overrightarrow{OM}.\vec{V}/c$ and the corresponding equation may be written:

$$M(t) = S(t - \overrightarrow{OM}.\vec{V}/c)$$

The signal received at a point R of the antenna is defined by the equation:

$$r(t, M, R) = M\left(t - \frac{MR(x, M)}{c}\right)$$

The signal obtained, after focusing, on reception, may be written:

$$R_{pf}(t, M, F) = \int S\left[t - \frac{\overrightarrow{OM}.\vec{V}}{c} - \frac{MR(x, M)}{c} + \frac{RF(x)}{c}\right] pr(x) dx$$

The illumination by a series of plane waves on emission, the focusing on reception and the forming of synthetic channels on emission may be defined as indicated hereinbelow.

The emission is assumed to be obtained by effecting a string of N emissions of plane waves with different directions. The individual receptions for these N emissions are recorded and the reception signals obtained are temporally staggered so that a forming of synthetic channels on emission is obtained.

By using the same notation as above, the reception signal of the emission of rank n is expressed by the equation:

$$R_{pf,n}(t, M, F) = \int S\left[t - \frac{\overrightarrow{OM}.\vec{V_n}}{c} - \frac{MR(x, M)}{c} + \frac{RF(x)}{c}\right] pr(x) dx$$

The reception signal with synthetic emission focused at F is expressed by the equation:

$$R_{Spf}(t, M, F) = \sum_{n=0}^{N-1} pe_n R_{pf,n}\left(t + \frac{\overrightarrow{OF}.\vec{V_n}}{c}\right) \text{ or}$$

$$R_{Spf}(t, M, F) =$$
$$\sum_{n=0}^{N-1} \int S\left[t - \frac{\overrightarrow{FM}.\vec{V_n}}{c} - \frac{MR(x, M)}{c} + \frac{RF(x)}{c}\right] pe_n pr(x) dx$$

Figure 13:
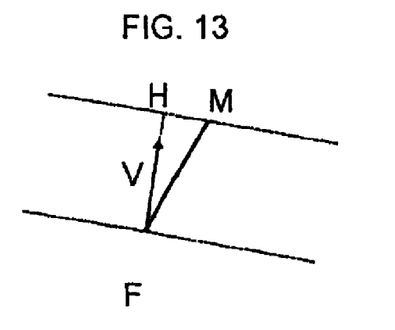
FIGS. 13 and 14 respectively depict diagrams illustrating the delay on emission.

The term of this equation, which corresponds to the emission-related delay, is proportional to the distance between the wave planes passing through the points F and M as shown schematically in FIG. 13. The delay is zero, if the straight line joining the points F and M is perpendicular to the vector V and hence in a wave plane passing through F. The phase shift at a frequency f is proportional to the value of the expression $2\pi f(\overrightarrow{FM}.\overrightarrow{V})$.

The summation of signals, which may or may not be focused, arising from reception channel forming and which correspond to emissions of plane waves with different directions temporally staggered as a function of the point examined, makes it possible to carry out synthetic emission channel formation improving the characteristics of the emission reception product pattern. The example which follows gives an exemplary embodiment which is not limiting.

Figure 14:
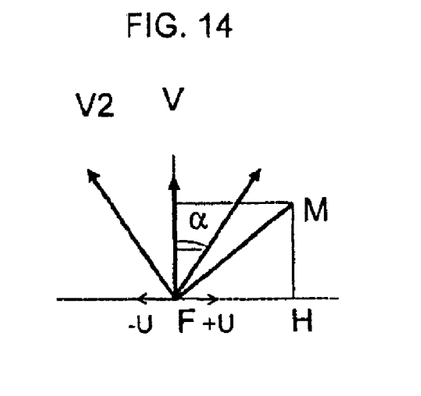

If the emission consists of two waves of equal amplitude with respective directions $\overrightarrow{V1}$ and $\overrightarrow{V2}$ symmetrical with respect to the V axis as shown schematically in FIG. 14, the delay times are proportional to $\overrightarrow{FM}.\overrightarrow{V1}$ and $\overrightarrow{FM}.\overrightarrow{V2}$.

If the signal is sinusoidal with frequency F, the reception signal is proportional to:

$$\exp\left(2\pi_{if}\frac{\overrightarrow{FM}.\overrightarrow{V1}}{c}\right) + \exp\left(2\pi_{if}\frac{\overrightarrow{FM}.\overrightarrow{V2}}{c}\right) =$$

$$2\exp\left(2\pi_{if}\frac{\overrightarrow{FM}.\vec{\nu}}{c}\right)\cos\left(2\pi_f\frac{FM.\sin\alpha}{c}\right)$$

i.e. $RE_{Spf} = 2\exp\left(2\pi_{if}\frac{FT.\cos\alpha}{c}\right)\cos\left(2\pi_f\frac{FH.\sin\alpha}{c}\right)$ If the point M moves perpendicularly to the bisector of the two emission wave vectors $\overrightarrow{V1}$ and $\overrightarrow{V2}$, after synthetic focusing of the emission, the contribution of the signal received at F by M is weighted by the expression $$\cos\left(2\pi\frac{\sin\alpha}{\lambda}x\right)$$

where x is the distance from F to the bisector and hence of period $\lambda/\sin\alpha$ independent of the distance from the antenna, since the two waves interfere homogeneously throughout the domain where they are plane.

Figure 15:
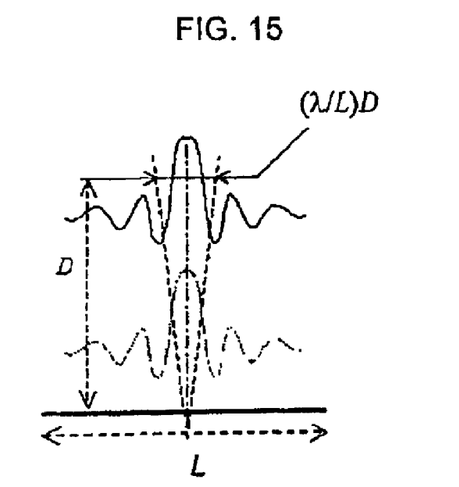
FIG. 15 depicts a set of curves relating to the weighting of the ambiguity diagram.

If several emission pairs of this type, but with different angles $\alpha$, are summed with different amplitude and phase coefficients, the overall weighting obtained corresponds to the sum of the cosine terms, with different periods. This therefore makes it possible to improve the ambiguity diagram of the image points by weighting them with a function which decreases in a certain domain of distances, on an axis perpendicular to the mean direction of propagation. The effect of this weighting varies with the distance of the point considered relative to the antenna, since the width of the focal spot along the said axis is of the order of $(\lambda/L) D$, where L is the length of the antenna and D is the focusing distance, see FIG. 15.

A weighting intended for example to introduce attenuation at large distances in the vicinity of the focal spot will introduce this same attenuation far from this focal spot at shorter distances. To remedy this, it is possible to create a distance-wise emission mode. Thus, for example, if the distances vary by a factor of two, the position of the lobes will also vary in a ratio of two.

Of course, the above arrangement is given by way of nonlimiting example and other sequences of plane waves with weightings and directions which differ and may or may not vary with distance may be used.

An exemplary antenna for emitter/receiver system of an imaging system is described hereinbelow. It allows synthetic emission composed of a sequence of plane waves and it pertains more especially to a probe antenna for echographic system. The antenna is intended to be used to emit a series of plane waves whose directions are much the same and differ only by a small angle relative to the mean angle of emission. There is provision for the signals received by the transducers after reflection to be combined after re-phasing for each of the target points defined by its individual geometrical coordinates. Although the antennas conventionally used in echography, radar or sonar may be suitable, there is proposed an antenna structure of reduced cost as compared with the conventional antenna structures in these fields of application.

There is provision for the exploration of the volume under examination, situated in front of the antenna, to be performed by varying the mean direction, mentioned hereinabove, of the plane waves.

Figure 16:
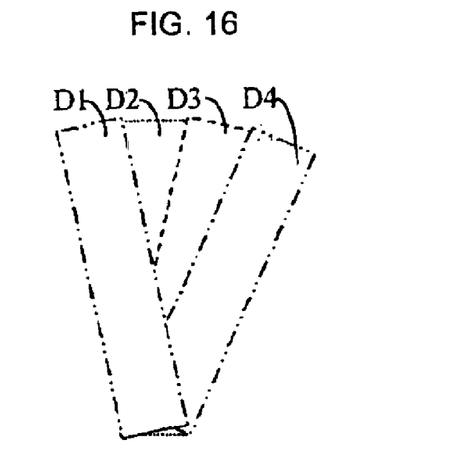
FIGS. 16 and 20 each depict an illustration of the domains swept with sound by a sequence of plane waves.

There is therefore provision to emit a sequence comprising a determined number of plane waves, which allow each to sound-sweep a domain which is regarded as delimited by a rectangle, within the framework of a plane representation, such as featuring in FIG. 16, wherein is illustrated a sequence for domains referenced D1, D2, D3 and D4, assumed to be obtained with the aid of an antenna which here is considered to be linear. In each of these domains and as long as the maximum distance is less than the Fresnel distance, the acoustic field created may be likened to a plane wave. The sequence effected is envisaged as allowing the exploration of a determined examination space by varying the mean angle of the plane emission waves, in such a way that the domains D1 to D4 to which they pertain overlap more or less partially, as is shown in FIG. 16. It is possible to use emissions whose directions are markedly different in order to construct a synthetic emission pattern covering a determined examination domain.

Figures 17, 18:
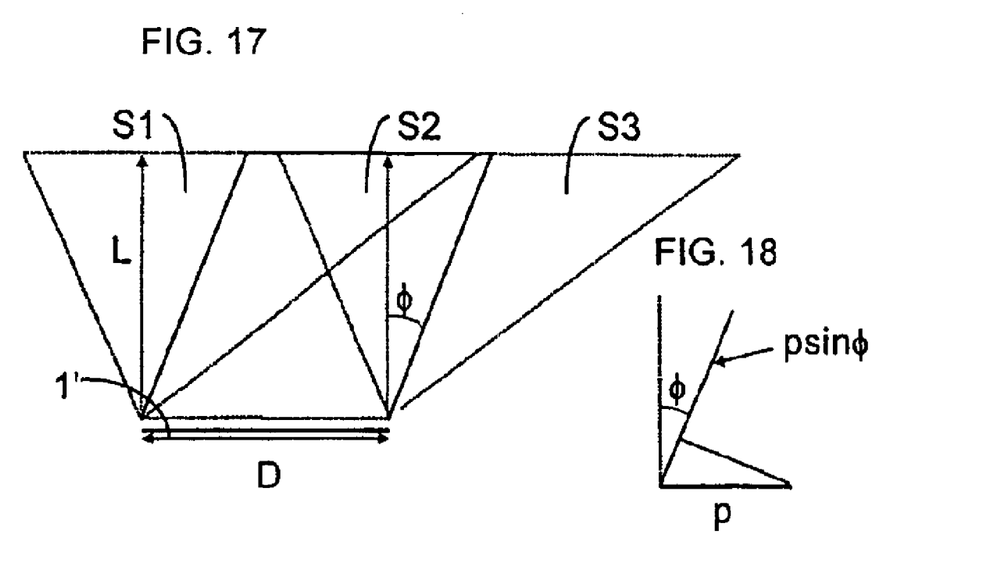
FIGS. 17 and 18 respectively depict a diagram representative of a domain covered by three sequences with different orientations and a delay relating to this diagram.

Each of the successive plane waves, in each series of illuminations, has much the same direction as that of the others and differs therefrom only by a small angle relative to the mean angle of emission. The exploration of a volume under examination is obtained by varying the mean direction. This is shown schematically in FIG. 17 wherein is depicted an antenna 1' and the domain covered by the field produced by three sequences with different orientations S1, S2, S3 whose respective domains partially overlap.

The transducers of the antenna 1' are assumed to be driven by identical signals, to within the weighting. These signals are broadband B and of brief duration, preferably of the order of a few 1/B and typically of the order of a microsecond for a band B of 3 MHz. The delay time $\tau$ which separates the signals applied to two successive transducers a length p apart is equal to $(p/c)\sin\phi$, see FIGS. 17 and 18. If the domains corresponding to these transducers are adjoining, the angle $\phi$ is given by the equation $\sin\phi=D/2L$, in which D is the length of the antenna and L the envisaged range of the system.

The angle $\phi$ is relatively large if the number N of transducers is high, thus for a mean frequency f of 3 MHz and a band of 3 MHz, and a linear antenna consisting of 256 transducers with pitch p of 0.25 mm, corresponding to half the wavelength at the frequency f, we obtain:

$\sin\phi = D/2L = 0.16$ with a range $L$ fixed at 200 mm.

Figure 19:
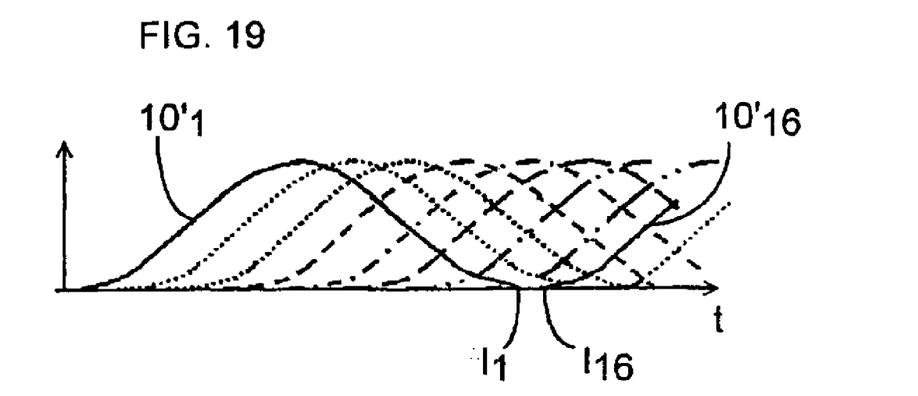
FIG. 19 depicts a time diagram relating to the pulses for activating the transducers of a linear antenna.

The delay time $\tau$ obtained is then equal to 26.7 ns and it follows therefrom that the pulse $I_{16}$ applied to the sixteenth transducer $10'_{16}$ is produced only after the end of the pulse $I_1$ applied to the first transducer $10'_1$, as illustrated in FIG. 19.

It is therefore possible, in this case, to multiplex the 256 transducers of an antenna in groups of sixteen and consequently to service the transducers of like rank of the various groups through one and the same wire signal transmission link, on the basis of the echograph 2 with which they are associated, the control links which are necessary for them not being considered here.

In a general manner, in the case of a linear antenna, of range L, which comprises a number N+1 of transducers aligned with a pitch p and emitting pulses of duration T, it is possible to emit just N+1/M signals towards the antenna on emission, on the basis of the echograph and under the conditions mentioned hereinabove.

M corresponds to the integer part of the quotient $$m = \frac{T}{(p/c\sin(Np/2L))}.$$

Figure 20:
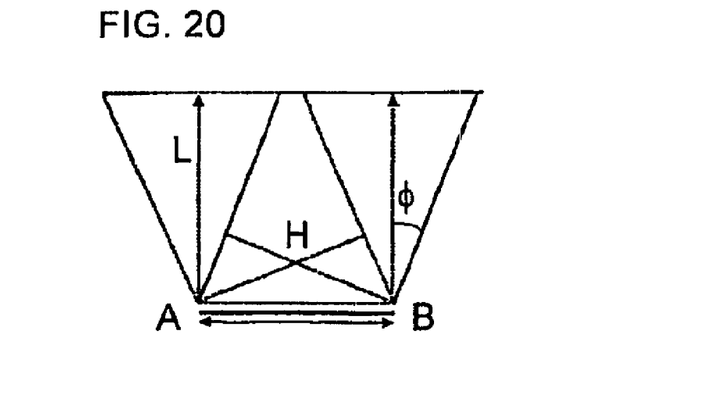

Such an emission leaves a portion of the examination domain unswept by sound, such as the triangular zone ABH in FIG. 20, it is however, possible to sweep this zone with sound by using only a reduced portion of the antenna, if need be. In the case of a linear or plane antenna, it is also possible to sweep this zone with sound by simultaneously driving all the transistors of the antenna with one and the same signal. This can be obtained through a modification of the device for multiplexing signals for control envisaged for the antenna, in a simple manner within the scope of the person skilled in the art.

What is claimed is:

1. A process intended to make it possible to obtain images by way of waves emitted by an antenna, after reflection of these waves at the level of a target-like assembly illuminated by the waves emitted and on the basis of which the images are extracted, said antenna, including an array alignment of wave emitter/receiver transducers comprising the steps of:

emitting a series of plane waves whose directions are different, various reception signals obtained in relation to a target point with given geometrical coordinates, being summed with amplitude and phase weightings which depend on this point in such a way as to consider there to be a re-phasing of the waves at the level of the point, as if these waves had been emitted simultaneously, and said reception signals being temporally staggered so that a forming of synthetic channels on emission is obtained.

2. The process as claimed in claim 1, in which a series of emissions is composed by employing excitation signals which are staggered with respect to one another and which selectively drive the antenna transducers so as to make it possible to obtain a series of plane waves whose directions are different.

3. The process as claimed in claim 2, in which the emission series includes emission pairs, of like nature, effected symmetrically at the level of each pair with respect to a chosen mean direction of propagation and with a different angle ($\alpha$) for each pair with respect to this mean direction and/or a different amplitude per pair.

4. The process as claimed in claim 2, in which the signals received by the antenna transducers for a series of emissions are summed for each of the target points with amplitude and/or phase weightings particular to this point so as to make it possible to obtain, by calculation, a re-phasing of the plane waves emitted which have reached this point.

5. The process as claimed in claim 3, in which the signals received by the antenna transducers for a series of emissions are summed for each of the target points and assigned a weighting effected according to a decreasing function of the distance of the point on an axis perpendicular to the mean direction of propagation.

6. The process as claimed in claim 4, in which the reception signals for a series of emissions are placed in memory before forming the reception channels.

7. The process as claimed in claim 4, in which the reception signals for a series of emissions are placed in memory after forming the reception channels.

8. The process as claimed in claim 1, in which the number of antenna transducers which are used in reception is reduced with respect to the number of antenna transducers used in emission for at least one of a same series of emissions.

9. The process as claimed in claim 1, in which the transducers are organized in such a way that several independent reception beams, overlapping or otherwise, are formed.

10. An imaging system making it possible to obtain images by way of waves emitted by an antenna of the system, after reflection of these waves at the level of a target-like assembly illuminated by the waves emitted and on the basis of which the images are extracted, the antenna comprising an array of wave emitter/receiver transducers, comprising software and hardware means for the implementation of the process according to claim 1.

11. An echographic imaging system, making it possible to obtain images by way of ultrasound waves emitted by an acoustic antenna of a probe of the system, after reflection of these waves at the level of a target-like assembly illuminated by the waves emitted and on the basis of which the images are extracted, the antenna comprising at an array of ultrasound wave emitter/receiver transducers, comprising software and hardware means for the implementation of the process according to claim 1.

12. A wave emission/reception probe for an echographic imaging system making it possible to obtain images by way of waves emitted by an antenna of said probe, after reflection of these waves at the level of a target-like assembly illuminated by the waves emitted and on the basis of which the images are extracted, the antenna including an array of wave emitter/receiver transducers comprising:

transducers constituting the array are multiplexed in groups of N, where each transducer is multiplexed with the transducer of like rank of each of the groups comprised by the array, the number of transducers per group being chosen so that an activation signal, consisting of a pulse, of a transducer of a group of transducers of an array, is terminated before the pulse corresponding to the activation signal of the transducer of like rank of a next group.

13. The wave emission/reception probe as claimed in claim 12, comprising a number (N+1) of transducers in an alignment where the transducers are distributed with a given pitch (p) and are emission-controlled by pulses of given duration (T), wherein said wave/emission probe is designed in such a way that the transducers of the array are controlled by a given number ((N+1)/M) of signals on emission such that the number (M) of the denominator is equal to the integer part of the quotient $$m = \frac{T}{(p/c)\sin(Np/2L)},$$

where c is the wave propagation speed and L the envisaged range of the system.

* * * * *